S. Moulton,
Belt Fastener.

Nº 66,244.          Patented July 2, 1867.

Witnesses;
Wm. H. Hammond
Theo. G. Ellis

Inventor;
S. Moulton

United States Patent Office.

STEPHEN MOULTON, OF HARTFORD, CONNECTICUT.

Letters Patent No. 66,244, dated July 2, 1867.

---

IMPROVED BAND-COUPLING.

---

*The Schedule referred to in these Letters Patent and making part of the same.*

---

TO ALL WHOM IT MAY CONCERN:

Be it known that I, STEPHEN MOULTON, of Hartford, in the county of Hartford, and State of Connecticut, have invented a new and improved Band-Coupling; and I do hereby declare that the following is a full, clear, and exact description of the construction and operation thereof, reference being had to the accompanying drawings and to the letters of reference marked thereon.

Like letters indicate similar parts in the several figures.

Figure 1:
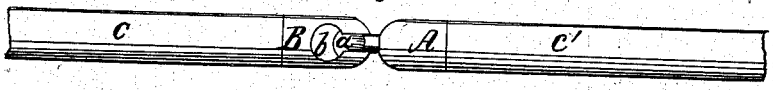
Figure 1 shows a top view of the improved band-coupling.
Figure 2:
Figure 2 shows a side view of the same.
Figure 3:
Figure 3 is a horizontal section through fig. 1, parallel to the plane of the paper.

My invention consists in adapting the common ball-and-socket joint to the purposes of a band-coupling by so constructing it that the ball and socket can be hooked together after being secured to the ends of the band.

The improved coupling is constructed as follows: The parts A and B are secured to the ends of the cord or band C C' by a screw-thread or any other common mechanical device. To the part A is attached the ball $a$ of the joint, and the part B forms the socket. The part B has an aperture, $b$, in the side, and a slit extending to the end through the rim of the socket to admit the ball $a$ when the two parts are to be hooked together.

Its operation is as follows: When it is desired to hook the two parts of the coupling together the ball $a$ is inserted into the opening $b$, and the neck joining the ball $a$ to the part A is passed along the slit through the socket to the position shown in the drawings, when it forms a complete ball-and-socket joint, admitting of motion in all directions laterally, and also acting as a swivel. If desired, the ball can be secured in its place by screwing the leather or other material of the cord or band further in so as to prevent the ball from escaping by the aperture.

What I claim as my invention, and desire to secure by Letters Patent, is—

1. A ball-and-socket joint, having an aperture in the side of the socket for hooking in the ball, substantially as herein described.

2. The application of a ball-and-socket joint, of the form and construction herein described, to the purpose of a coupling of a band or cord, substantially as herein set forth.

S. MOULTON.

Witnesses:
WM. H. HAMMOND,
THEO. G. ELLIS.